United States Patent [19]

Juutilainen

[11] Patent Number: 4,577,267

[45] Date of Patent: Mar. 18, 1986

[54] ADAPTER FOR FIELD SIGNALS OF COMPUTERS, MICROPROCESSOR SYSTEMS OR THE LIKE DIGITAL ELECTRONIC CIRCUITS

[75] Inventor: Timo Juutilainen, Espoo, Finland

[73] Assignee: Delcon Oy, Finland

[21] Appl. No.: 596,922

[22] Filed: Apr. 5, 1984

Related U.S. Application Data

[63] Continuation-in-part of Ser. No. 341,482, Jan. 21, 1982, abandoned.

[30] Foreign Application Priority Data

Jan. 26, 1981 [FI] Finland ................... 810207

[51] Int. Cl.$^4$ ........................... H02M 3/335
[52] U.S. Cl. ..................... 363/19; 323/224; 323/266; 363/89
[58] Field of Search ........ 363/18, 19, 49, 95, 363/97, 89, 101; 323/224, 266, 284, 303, 901, 908

[56] References Cited

U.S. PATENT DOCUMENTS 4,163,278  7/1979  Onoue et al. .................. 363/101
4,315,208  2/1982  McElroy et al. ............... 323/303
4,494,064  1/1985  Harkness ...................... 323/303

FOREIGN PATENT DOCUMENTS 41720  4/1978  Japan .......................... 323/21

*Primary Examiner*—Peter S. Wong
*Assistant Examiner*—Judson H. Jones
*Attorney, Agent, or Firm*—Eugene D. Farley

[57] ABSTRACT

Adapter for field signals of computers, microprocessors systems or the like digital electronic circuits. The adapter receives either AC or DC signals, from external or field sources or from computers, microprocessor systems of the like digital electronic circuits, and provides AC or DC control voltages to external or field controls or to computers, microprocessor systems or the like digital electronic circuits. The adapter includes a first switching circuit which responds to the level of an input signal, and which actuates an oscillator which includes the primary of a transformer as its load. Energy is transferred by the transformer secondary to appropriate control circuits for use elsewhere. The adapter also includes a second switching circuit which also responds to a different level of the input signal, the second switching circuit diverting the input signal current into itself across an artificial load when the first switching circuit is inoperative. By adjusting component values in the basic circuit, the adapter can accept and provide a wide range of AC or DC voltages and currents.

10 Claims, 8 Drawing Figures

ADAPTER FOR FIELD SIGNALS OF COMPUTERS, MICROPROCESSOR SYSTEMS OR THE LIKE DIGITAL ELECTRONIC CIRCUITS

CROSS REFERENCE TO RELATED APPLICATION

This application is a cntinuation-in-part-of application Ser. No. 341,482, filed Jan. 21, 1982 and now abandoned.

BACKGROUND OF THE INVENTION

The present invention relates to an adapter device for field, i.e., remote, signals of computers, microprocessor systems or the like digital electronic circuits, said adapter comprising a rectifier unit for input signals, an ON-OFF voltage switching circuit operated by the input voltage, and an adapter circuit.

An adapting unit used in this type of adapter devices is generally an opto-isolator which comprises a light-emitting diode and a light sensitive transistor. In such a micro-component, the gaps, i.e., spacings, between connecting lines are usually not sufficient for the required (at least 3750 V) potential difference, i.e., to prevent arcing between adjacent conductors. One particular nuisance is the need to connect the adapter device not only to the input signal but also to a separate source of energy, since no significant energy can pass through the device, i.e., an opto-isolator. Another drawback in the prior art adapter devices is inadequate interference elimination, especially as far as the capacitive interference disturbances of field cables are concerned.

The main objective of this invention is to provide an adapter of the above type by means of which the energy of an input signal can be used for input or output control without external power sources and which is further capable of providing a sufficient isolation against large induced potential differences.

SUMMARY OF THE INVENTION

In order to achieve these objects, the adapter according to the invention is characterized in that said adapting unit includes a transformer whose primary side is controlled by an input-signal-operated oscillator and whose secondary side is fitted with another rectifier unit and possibly an electronic switch.

A pulse transformer can be used for transmitting energy from the adapter device's input to its output while at the same time accomplishing galvanic, i.e., high induced potential, isolation. A pulse transformer can be readily pigeonholed (compartmentized, i.e., shielded) so as to provide a sufficient voltage breakdown isolation protection also for connections. Paticularly, when using a triac as an electronic switch in the output circuit of an adapter device, an advantage gained is that the triac is continuously supplied with necessary triggering energy which is favorable in view of the service life of said triac.

The adapter according to one preferred embodiment of the invention is characterized in that the rectifier unit of input signals comprises a diode or the like which provides half-wave rectification and at the same time eliminates disturbances capacitively modulated in the signal. Filtering away the capacitively-induced interference is based on the fact that in half-wave rectification the capacitances between conductors are substantially charged with peak values of the interference voltages.

According to another preferred embodiment of the invention, upstream of the ON-OFF voltage switching unit is coupled with a current switching unit which alternates with the voltage switching unit in such a manner that, with the latter switched ON, current does not pass through the current switching unit and, with the voltage switching unit switched OFF, the input signal current passes through the current switching unit. This arrangement eliminates the effect of source impedance on the switching which will thus be more stable.

In the following, some embodiments of the invention are illustrated with reference to the accompanying drawings.

DETAILED DESCRIPTION OF THE INVENTION

Figure 1:
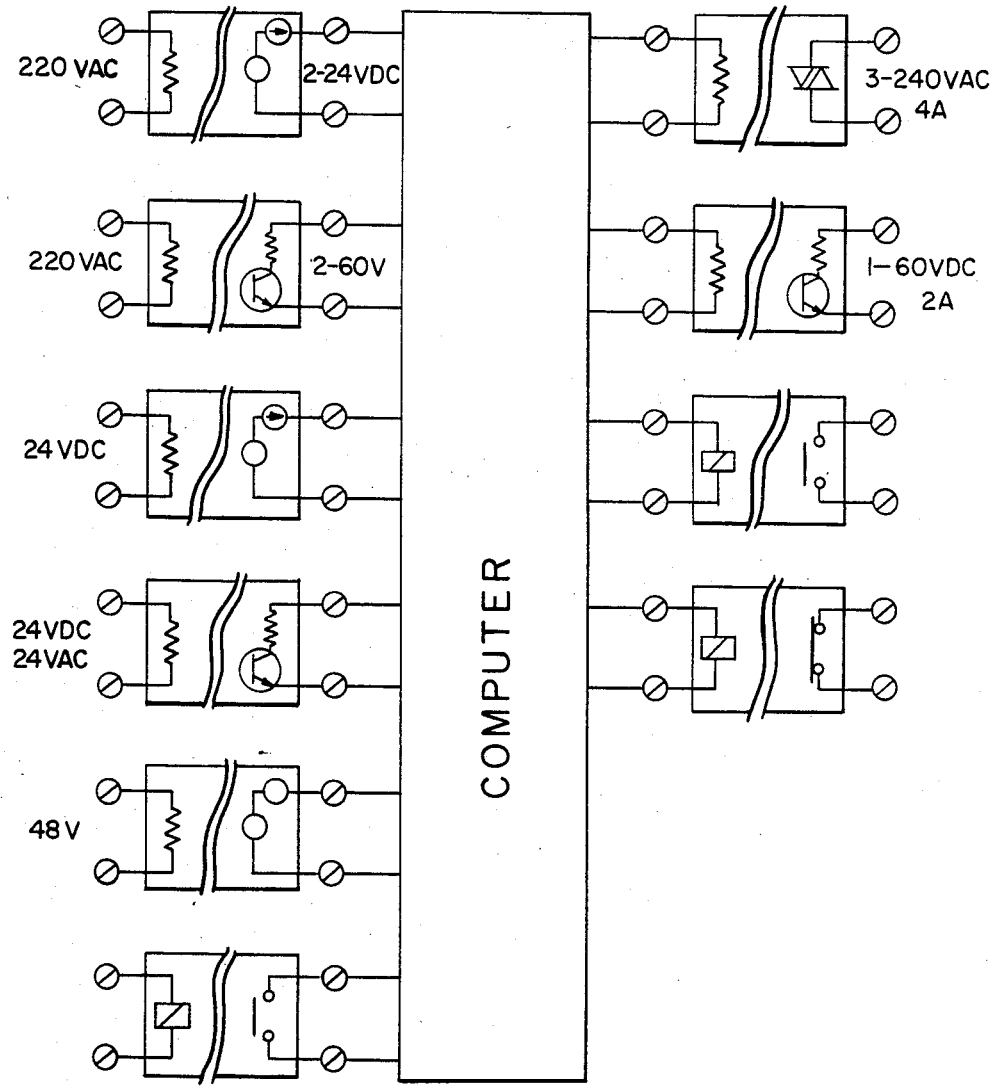
FIG. 1 is a block diagram for applying input and output adapters on the invention in connection with a computer.

FIG. 1 illustrates a computer having a plurality of pairs of input terminals at the left side and a plurality of pairs of output terminals at the right side. The pairs of input terminals are connected to adapters the upper five of which each illustrate in block form the adapter of FIG. 2. The pairs of output terminals are connected to output adapters the upper two of which also illustrate in block form the adapter of FIG. 2.

Figure 2:
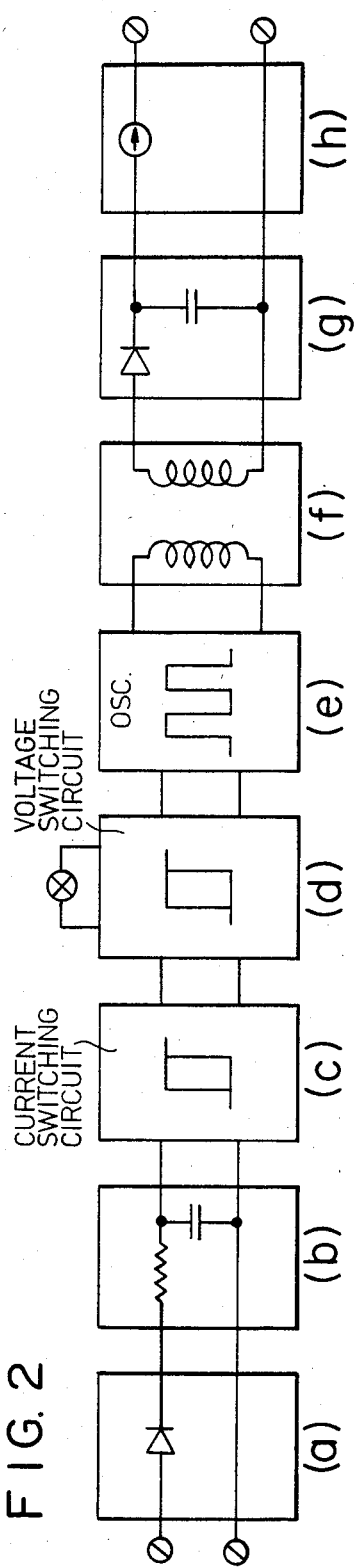
FIG. 2 shows a block diagram for an adapter of the invention.

The following description deals with the operation and significance of the adapter blocks with reference made to FIG. 2. An incoming field, i.e., remote, signal, e.g., 220 V main voltage, is processed by a plurality of different stages until it is an applicable low voltage signal.

In block "a", from the input signal are attenuated away capacitively coupled signal components or so-called interference disturbances by effecting half-wave rectification of the signal by means of a diode. If an input signal is forced to run parallel with another 220 VAC signal, e.g., in a set of cables or even in one and the same trunk cable, there will easily be formed considerable interference signals capacitively, i.e., by way of an electromagnetic field. In block "a", circa 99.9% of such signals can be filtered away due to the fact that inter-conductor capacitances will be charged in half-wave rectification substantially to peak values of the interference voltages.

Block "b" attenuates transient disturbances or temporary disturbance peaks developed in the input signal for various reasons.

Block "c" is a current-switching unit whose operation alternates with a following On-OFF voltage-switching unit "d" in such a manner that, when voltage-switching unit "d" is switched OFF, the input signal current runs through current-switching circuit "c" and, when voltage-switching circuit "d" is switched ON, the current running through current-switching unit "c" is disconnected. This is how to eliminate the effect of an input signal source impedance on the switching event of the ON-OFF voltage-switching unit "d". This ensures a controlled switch-on (as well as switch-off) regardless of external connections.

The current- and voltage-switching units "c" and "d" are equipped with, i.e., exhibit, hysteresis. The voltage-switching unit "d" is also fitted with an LED signal lamp which always acts exactly simultaneously with the output circuit of the adapter.

Block "e" is an oscillator operated by the input signal. For example, it can be a pulse transformer-operating oscillator, as will be seen in FIG. 5. Block "e" is any kind of oscillator capable of being initiated by the input signal.

Block "f" is a transformer, the primary of which is driven by the oscillator of block "e", and which incorporates high-voltage insulation to provide 3750 V protection to meet the requirements of a voltage protected circuit.

Block "g" rectifies the low voltage received from the secondary winding of the transformer of block "f".

Block "h" supplies, e.g., 24 V,20 mADC (nearly 0.5 W) at the output terminals 3 for further use.

Figure 4:
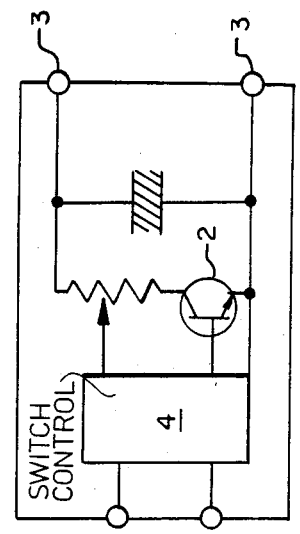
FIGS. 3 and 4 show two embodiments of an adapter output circuit replacing the secondary side block "h" in the block diagram of FIG. 2.
Figure 3:
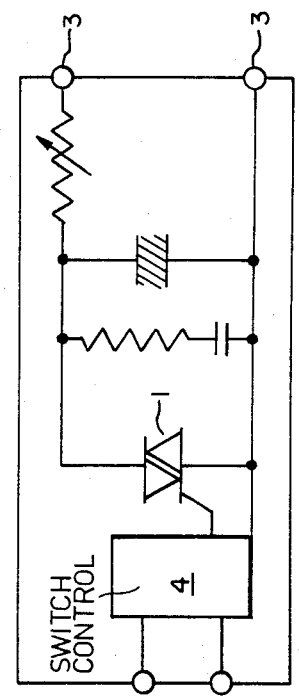

If it is desired to use the adapter of the invention as an electronic switch controlled either by a field signal or a computer, block "h" of FIG. 2 is replaced, e.g., by switch solutions illustrated in FIGS. 3 and 4. In FIG. 3, triac 1 is connected across output terminals 3 as a switch. In FIG. 4, transistor 2 is connected across output terminals 3 for the same purpose. In either case, triac 1 or transistor 2 receives its control energy by way of a control device 4 operated by the pulse transformer's secondary side through rectifier "g". The control energy is continuous direct current supplied exclusively through the transformer "f" by the oscillator "e", which can operate at ultrasonic frequencies. Thus, the adapter of the invention is particularly preferable for a triac 1 as shown in FIG. 3 by ensuring that the triac always has necessary triggering energy when it is conductive.

Figure 5:
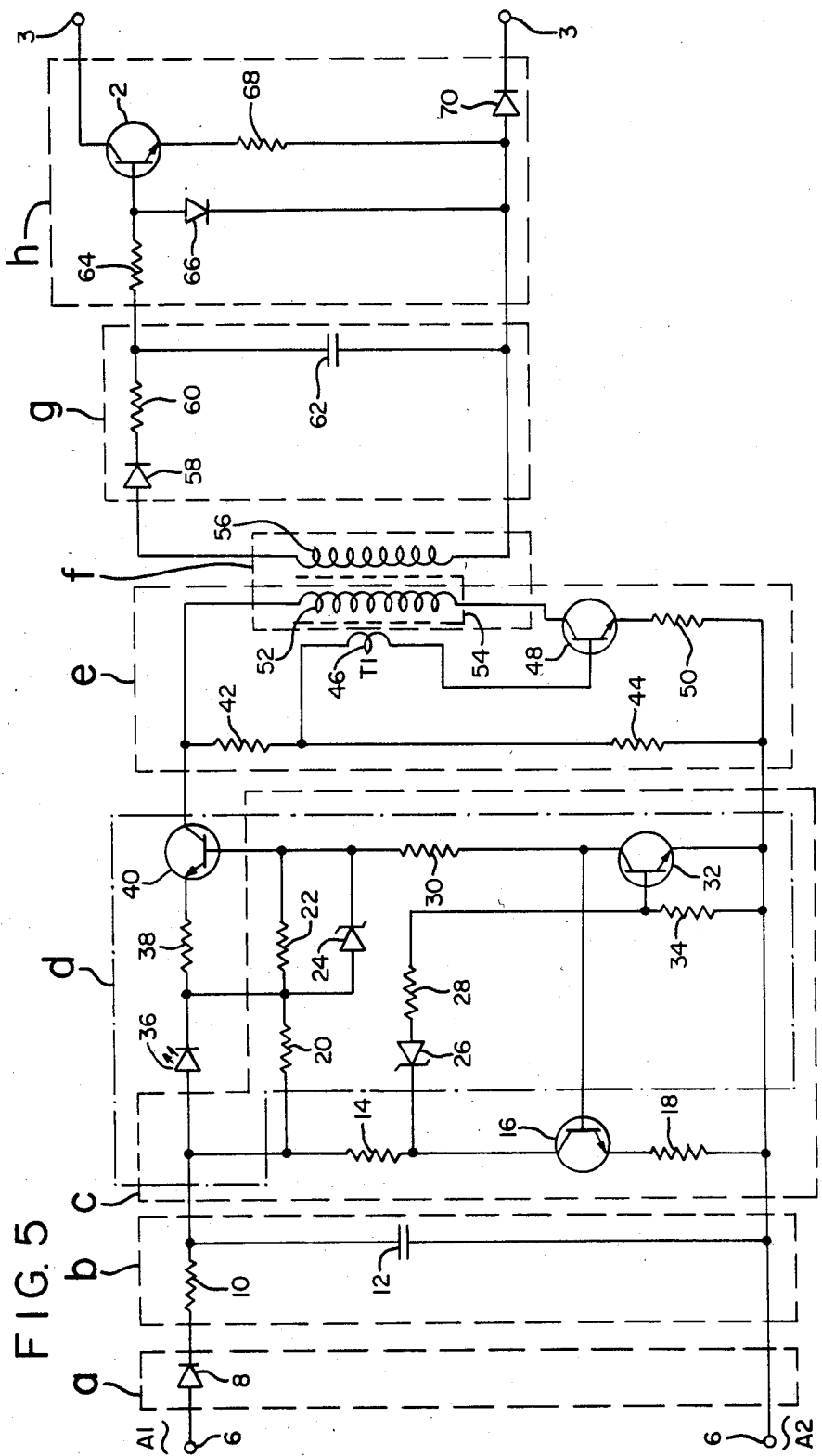
FIG. 5 is a schematic circuit diagram of one embodiment of the adapter of the invention, with the circuit components corresponding to the functional units of FIG. 2 contained in dotted outline thereon.

Turning now to FIG. 5, we see one embodiment, in schematic form, of the invention as depicted in block form in FIG. 2. The general circuitry, as depicted in FIG. 5, will permit handling a wide range of input and output voltages by merely adjusting the values of the components, in a manner well-known to those skilled in the art. Thus, for example, as depicted in FIG. 1, the input can accommodate a substantial range of input voltages and, depending upon the output configuration (block "h", and perhaps "g", in FIG. 2), can provide a substantial range of output voltages or functions.

In FIG. 5, diode 8 corresponds to block "a". As explained earlier, diode 8 reduces the level of stray voltages capacitively or otherwise coupled to the input signal conductors. Resistor 10 and capacitor 12 correspond to block "b", and operate to attenuate other signals not removed by diode 8.

First switching means block "d" and second switching means block "c" are interrelated in that they share several common components. The circuits represented operate alternatively; that is, when second switching means block "c" is operative, first switching means block "d" is inoperative, and when second switching means block "c" is inoperative, first switching means block "d" is operative. Block "c" is normally operative, and is a current switching circuit which includes resistor 14, transistor 16 and resistor 18; it also includes, in common with block "d", resistors 20 and 22, zener diodes 24 and 26, and resistors 28, 30 and 34, and transistor 32. When the input signal potential across capacitor 12 is insufficient to turn on transistor 40, and thus the oscillator represented by block "e", the current through resistors 20, 22 and 30, the base-emitter junction of transistor 16 and the resistor 18 is sufficient to turn on transistor 16 so that the input signal current flows through resistors 14 and 18 and the emitter-collector circuit of transistor 16, thus effectively diverting the current that would otherwise provide energy to operate the oscillator "e", and providing an alternate or artificial load for the field signal source so that it is not short-circuited. This condition exists for either AC or DC signals whenever the signal level is below a predetermined level. In the adapter of the invention represented by the topmost of the adapter blocks on the left-hand side of the computer in FIG. 1, whre the input voltage is a nominal 220 VAC, the predetermined level can be, e.g., anything below about two-thirds of the nominal voltage.

When the input voltage rises above this predetermined level, then the voltage across zener diode 26 exceeds the holding voltage, and current starts to flow through resistors 28 and 34, thereby increasing the base voltage of transistor 32, turning it on so that current increases through resistor 30, thereby elevating the base voltage of transistor 40 to conduction, and providing current to transistor 48 to operate oscillator block "e".

However, as transistor 32 starts to conduct, the same current that causes transistor 40 to conduct also changes the base voltage of transistor 16, cutting off the collector-emitter current through resistor 14 and dropping the bias voltage of zener diode 26 below conduction, cutting it off. The reduced current flow through resistors 28 and 34 drops the base voltage of transistor 32 below conduction level, thereby cutting it off. Only transistor 40 remains conducting, supplying the energy to operate oscillator "e".

It will be seen that block "c" is rendered inoperative when block "d" is operative, and block "d" is rendered inoperative when block "c" is operative. Field signal current runs through block "c" when block "d" is inoperative, i.e., when oscillator "e" is not being driven by block "d".

It will be seen that block "d" includes, in addition to the components it shares in common with block "c", the light emitting diode 36, the resistor 14 and the transistor 40.

Figure 7:
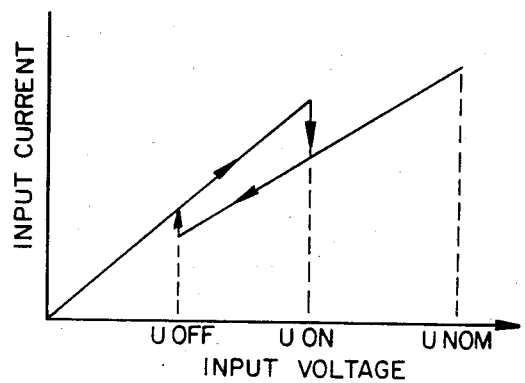
FIG. 7 is a graphical representation of how the adapter of the invention responds to a variable input signal and produces a DC output control signal.
Figure 8:
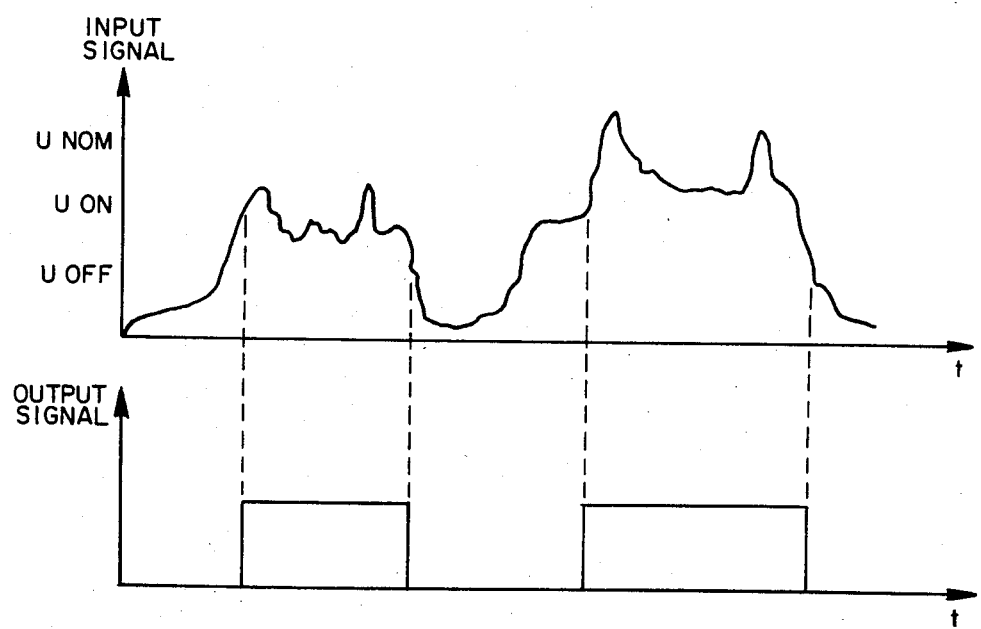
FIG. 8 is a graphical representation of the operation of blocks "c" and "d" of FIG. 2, with reference to FIG. 5.

The above-described operation is clarified by reference to FIGS. 7 and 8. Assume initial conditions with current switching circuit block "c" operative, i.e., with current flowing through transistor 16 and resistors 14 and 18. As voltage increases across capacitor 12, this current will increase more-or-less proportionately. However, as the input voltage continues to increase toward the nominal voltage, at some predetermined voltage determined by design, e.g., two-thirds of the nominal voltage, the voltage across zener diode 26 will bring it into conduction at the point on the graph of FIG. 7 designated U ON, whereupon the switching sequence described earlier will take place, bringing the voltage-switching circuit block "d" into conduction and cutting off current-switching block "c", while reducing the input current slightly, as depicted in FIG. 7, also. As the input voltage continues to increase toward the nominal voltage, the current again continues to increase more-or-less proportionately, but at a slightly lesser slope. When the input voltage is decreased, the current decreases until the point on the graph of FIG. 7 designated U OFF, whereupon the switching-off action described earlier takes place, causing a slight increase in input current as depicted in FIG. 7. This will occur at some predetermined voltage U OFF as shown. U ON can be any desired voltage, e.g., two-thirds of the nominal voltage, while U OFF can be at any desired voltage between 0 V and U ON, e.g., one-third of the nominal voltage. It will be recognized by those skilled in the art that this type of behavior in electronic circuits is known as hysteresis, and is designated by the symbol which appears in blocks "c" and "d".

When an arbitrary signal is introduced to a circuit exhibiting such behavior, it responds as depicted in the graphs of FIG. 8. First switching means block "d" is initially inoperative and second switching means block "c" is initially operative. Block "d" of the adapter of the invention turns on, and block "c" turns off when the arbitrary input signal shown reaches U ON, and block "c" turns on and block "d" turns off when the input signal reaches U OFF, with the proviso that once the circuit has responded to a positive-going signal, it will not respond to another positive-going signal at the same voltage level until it has been reset by a negative-going signal at a lower voltage level. Similarly, once it has responded to a negative-going signal at the proper voltage level it will not respond to another at the same level until it has been reset to the opposite mode by a positive-going signal at a higher voltage level. This can be seen by an inspection of the upper waveform of FIG. 8. These voltage levels are set by design and are usually adjustable.

The lower waveform of FIG. 8 depicts a DC output signal from a circuit such as that in block "d" of FIG. 5, with the positive pulses representing the current that would initiate the operation of oscillator block "e". It will be understood by those skilled in the art that this waveform could represent voltage, as well, and could be either positive or negative, without departing from the spirit or intent of the invention. This lower waveform could also represent the rectified filtered output from the transformer block "f" as will become clear below.

Returning to FIG. 5, block "f" represents transformer T1, with tickler winding 46, primary winding 52, and secondary winding 56. U-shaped dashed line 54, descending between windings 46 and 52, and ascending between windings 52 and 56, represents high-voltage insulation such as would be needed to give high voltage protection and isolation between the input and output circuits, e.g., to give 3750 V isolation between the field circuits that might be exposed to accidental high voltage contact, and the computer. Thus, the adapter of the invention not only provides signals to, and receives signals from, the computer, but it serves to protect it against accidental, and potentially damaging, contact with high voltages, especially in industrial environments.

Block "g" of FIG. 2 is represented by the diode 58, resistor 60 and capacitor 62 of FIG. 5. This circuit rectifies and filters the AC voltage and current received from the secondary winding 56 of transformer T1 so that it can be used, either directly or indirectly, to control or input to other circuits. As explained above, the "square" or keyed pulses shown in the lower waveform of FIG. 8 are examples of the output of this circuit: when the oscillator is operating, a DC output is generated; when the oscillator is not operating, no output is generated.

The output circuit contained within the dashed lines designated block "h" in FIG. 5 is one example of a circuit controlled by the DC output of block "g". Resistor 64 and diode rectifier 66 divide the voltage received from output circuit "g" for controlling the base voltage of transistor 2. The threshold bias of diode 66 provides the appropriate voltage to turn transistor 2 on. Since transistor 2 is a DC switch, diode 72 protects it in case voltage of incorrect polarity is applied at terminals 3. Resistor 68 limits the maximum current that will flow through the transistor 2 at maximum input voltage. The circuits depicted in FIGS. 3 and 4 are two other possible output circuits that could be controlled by the DC output of block "g", and the circuit shown in FIG. 6, to be described in greater detail hereinafter, is another. It will be recognized by those skilled in the art that these are only a few of many such circuits that would lend themselves to being controlled by the control signals that would be generated by the oscillator circuit of the invention. Further, it will also be recognized by those skilled in the art that these are representative of a class of circuits that are used for process control in widely differing situations.

Figure 6:
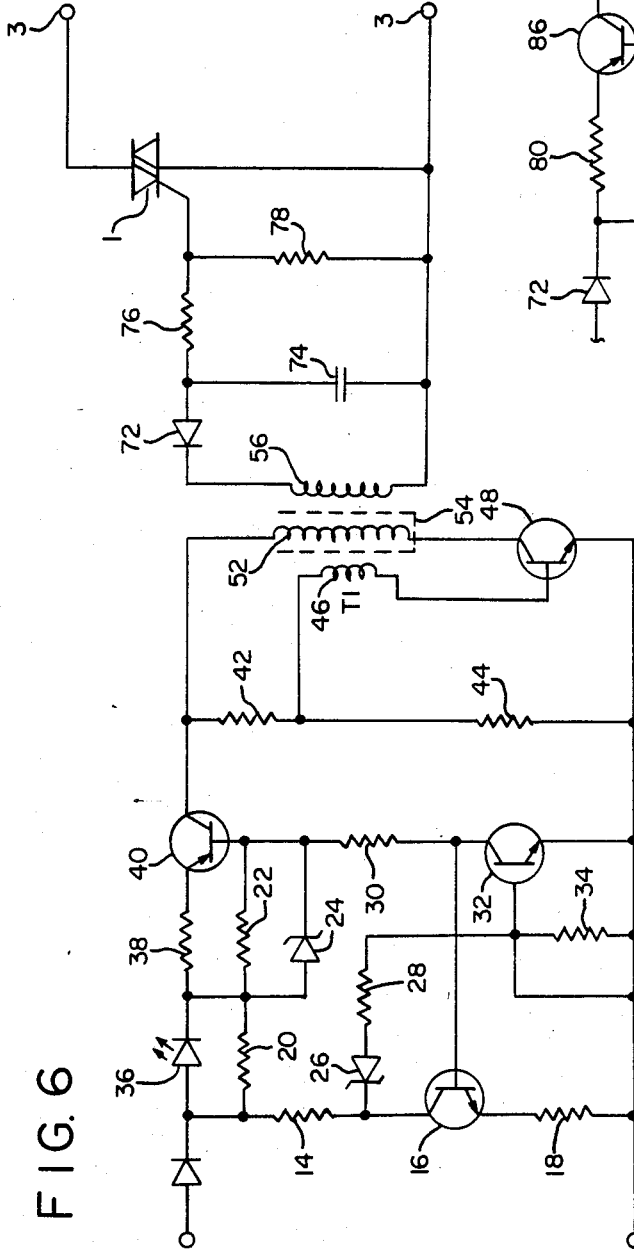
FIG. 6 is a schematic circuit diagram illustrating another embodiment of the block diagram of FIG. 2.

FIG. 6 illustrates a modification of the adapter circuit of the invention, useful for accepting DC input signals and controlling AC currents or voltages used to control various kinds of equipment. It will be noted by those skilled in the art that the circuit in general is similar to the circuit of FIG. 5, with the exception that the attenuator circuit corresponding to block "b" of FIG. 2 (resistor 10 and capacitor 12) is not present as it is not needed, since DC voltage supply circuits are normally of relatively low impedance, and stray induced voltages or currents are less likely to be present as a result of stray electric fields. Such circuits are, typically, digital electronic circuits such as are found in computers and microprocessor systems. Diode rectifier 72, capacitor 74, and resistors 76 and 78 provide a DC control voltage to the gate electrode of triac 1, which will turn on when oscillator "e" generates an output signal, enabling it to be used as an AC control switch for AC power circuits.

Figure 9:
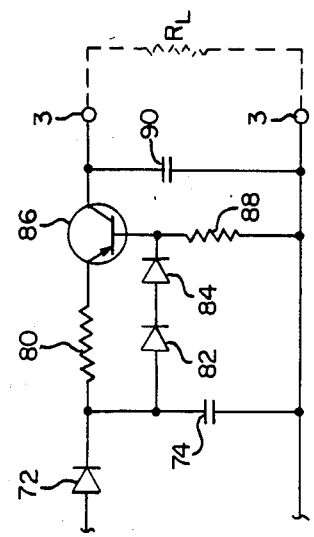

FIG. 9 illustrates yet another output circuit which can be operated from the basic circuit of FIGS. 2 and 5. The voltage from transformer T1 is rectified and filtered by diode 72 and capacitor 74. When the voltage across filter capacitor 74 exceeds the threshold voltage of the diodes 82 and 84, the voltage drop across resistor 88 raises the base voltage of transistor 86 to conduction. The external load resistance $R_L$ determines the current through transistor 86. When the current through emitter resistor 80 exceeds 20 mA, the voltage drop across resistor 80 will exceed the threshold voltage of diodes 82 and 84, and the change of emitter-to-base voltage of transistor 86 will prevent any further increase in output current. The capacitor 90 is a filter capacitor.

The transistor 86 and associated components comprise an amplifier which, for load currents of less than 20 mA, operates simply as a switch, but which in all cases limits the output current to a maximum of approximately 20 mA. This feature may be used to set the output voltage to a desired level by selecting a suitable load resistor $R_L$ so that, e.g., 12 V output voltage can be obtained by calculating the load resistor $R_L$ from the formula:

$$R_L = \frac{12\ V}{20\ mA} = 600\ ohms.$$

An additional advantage is that the output signal is an active current signal, so that the transistor compensates for the effects of external interference currents. Thus, if a noise current induced in the output circuit tended to increase the output current, the transistor will decrease its current correspondingly to cancel out the interference. In fact, the secondary winding of transformer T1 can be shorted without damaging the output circuit of FIG. 9.

It will be seen by those skilled in the art that the general circuit, as depicted in FIGS. 5 and 6, comprises a novel and versatile circuit, easily modified to accept field signals from remote sources and adapting them, no matter what their magnitude or character, to the input requirements of a control computer. The adapter of the invention is just as easily adapted to accept control signals from a control computer and modify them to the requirements for equipment control signals. The voltages given on the left-hand input portion of FIG. 1 indicate a representative range of input voltages which can be handled by various modifications of the circuit of FIG. 2, as exlained by the embodiment of FIG. 5. The voltages on the right-hand output portion of FIG. 1 indicate the voltages and/or current ranges which can be controlled by various modifications of the basic circuit.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

What I claim as my invention is:

1. Apparatus for adapting field signals of computers, microprocessor systems or the like digital electronic circuits having output signals, including input means and output means, first switching circuit means responsive to a first level of signals at said input means, oscillator means actuated by said first switching circuit means, and transformer means having primary and secondary winding means, said primary winding means being included in said oscillator means and said secondary winding means being included in said output means, the imrovement comprising:
   (a) second switching circuit means responsive to a second level of said signals at said input means, said second switching circuit means being normally operative;
   (b) each of said first and said second switching circuit means exhibiting hysteresis in its response to said signals at said input means;
   (c) said first switching circuit means being inoperative when said second switching circuit means is operative, and said first switching circuit means being operative when said second switching circuit means is inoperative; and
   (d) said signals at said input means running through said second switching circuit means when said first switching circuit means is inoperative.

2. Apparatus for adapting field signals of computers, microprocessor systems or the like digital electronic circuits having output signals, comprising:
   (a) input means for receiving first signals;
   (b) output means for providing second signals;
   (c) first switching circuit means responsive to a first level of said first signals at said input means;
   (d) oscillator means actuated by said first switching circuit means;
   (e) second switching circuit means responsive to a second level of said first signals at said input means, said second switching circuit means being normally operative;
   (f) said first switching circuit means being inoperative when said second switching circuit means is operative, and said first switching circuit means being operative when said second switching circuit means is inoperative;
   (g) said first signals running through said second switching circuit means when said first switching circuit means is inoperative; and
   (h) transformer means having primary and secondary winding means, said primary winding means being included in said oscillator means and said secondary winding means being included in said output means.

3. Apparatus according to claim 1 or 2, wherein said first switching circuit means is a voltage switching circuit and said second switching circuit means is a current switching circuit.

4. Apparatus according to claim 1 or 2, wherein said first signals at said input means is said field signals.

5. Apparatus according to claim 1 or 2, wherein said first signals at said input means is said output signals.

6. Apparatus according to claim 1 or 2, wherein said input means includes rectifier means and filter means for adapting said input means for operation with AC field signals.

7. Apparatus according to claim 1 or 2, wherein said output means includes rectifier means and filter means for adapting said output means for operation with DC controlled circuitry.

8. Apparatus according to claim 1 or 2, wherein said output means includes means for controlling AC circuitry.

9. Apparatus according to claim 8, wherein said means for controlling AC circuitry includes triac means.

10. Apparatus according to claim 1 or 2, wherein said oscillator means includes tickler winding means in said transformer means.

* * * * *